United States Patent [19]

Brunnhofer

[11] Patent Number: 5,076,329
[45] Date of Patent: Dec. 31, 1991

[54] LAYERED FUEL-LINE HOSE

[75] Inventor: Erwin Brunnhofer, Fuldabrück, Fed. Rep. of Germany

[73] Assignee: Technoform Caprano & Brunnhofer KG, Fuldabruck, Fed. Rep. of Germany

[21] Appl. No.: 607,152

[22] Filed: Oct. 31, 1990

[30] Foreign Application Priority Data

Nov. 20, 1989 [DE] Fed. Rep. of Germany ....... 3938497
Jan. 17, 1990 [DE] Fed. Rep. of Germany ....... 4001125

[51] Int. Cl.$^5$ .............................................. F16L 11/04
[52] U.S. Cl. ..................................... 138/137; 138/140; 138/DIG. 7
[58] Field of Search ............... 138/126, 137, 140, 141, 138/DIG. 7; 427/209; 428/36.7

[56] References Cited

U.S. PATENT DOCUMENTS

| 3,584,656 | 6/1971 | Assendelet et al. | 138/141 |
| 4,614,208 | 9/1986 | Skarelius | 138/140 |
| 4,617,213 | 10/1986 | Asano et al. | 138/126 |
| 4,647,483 | 3/1987 | Tse et al. | 138/DIG. 7 |
| 4,657,285 | 4/1987 | Akiyama et al. | 138/137 |
| 4,746,562 | 5/1988 | Fant | 428/36.7 |
| 4,758,454 | 7/1988 | Wood | 138/137 |
| 4,842,024 | 6/1989 | Palinchak | 138/126 |
| 4,862,923 | 9/1989 | Kitami et al. | 138/137 |
| 5,004,649 | 4/1991 | Yamasaki et al. | 427/209 |

FOREIGN PATENT DOCUMENTS 3821723 9/1989 Fed. Rep. of Germany.

Primary Examiner—Philip R. Coe
Assistant Examiner—James F. Hook
Attorney, Agent, or Firm—Herbert Dubno; Andrew Wilford

[57] ABSTRACT

A layered tubing for use in a motor vehicle has five layers, namely a thick tubular outer layer formed of a Nylon 11 or Nylon 12, a thick tubular intermediate layer of Nylon 6, a thin tubular intermediate bonding layer between and bonded to the thick outer and intermediate layers and formed of polyethylene or polypropylene, a thin tubular intermediate solvent-blocking layer inside the thick layers and formed of a copolymer of ethylene and vinylalcohol, and an inner layer of Nylon 6 inside the blocking layer. The thick outer and intermediate layers each have a thickness of between 0.2 mm and 0.7 mm. The thin intermediate blocking layer comprises by weight 30% to 45% polyethylene and the intermediate blocking layer has a thickness of between 0.1 mm and 0.2 mm. The inner layer has a thickness of at most 0.1 to 0.5 mm and the bonding layer has active side chains of maleic acid anhydride and a thickness of between 0.05 mm and 0.2 mm.

8 Claims, 1 Drawing Sheet

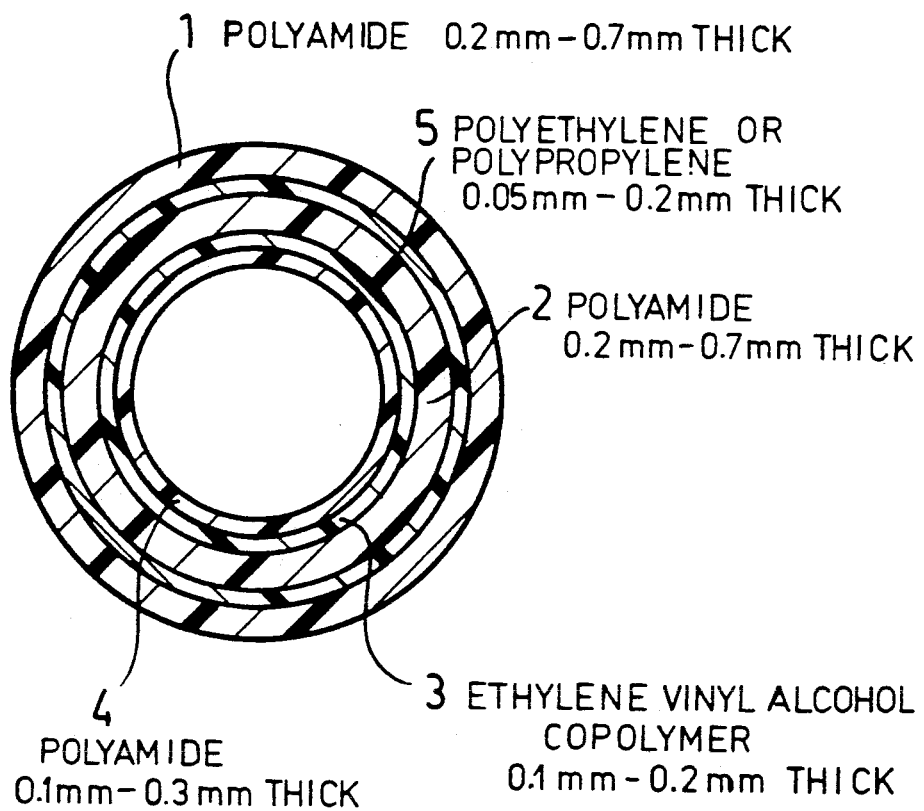

5,076,329

LAYERED FUEL-LINE HOSE

FIELD OF THE INVENTION

The present invention relates to a hose for use in a motor vehicle. More particularly this invention concerns a layered hose usable as a fuel line in a motor vehicle.

BACKGROUND OF THE INVENTION

Tubing used in a motor vehicle is frequently exposed to alcohol. The motor-vehicle fuel itself frequently contains alcohol-type additives serving as dryers or can even be in large part formed by alcohol itself serving as fuel, the brake fluid includes alcohol to prevent any condensate in the brake lines from freezing up, and the fluid used in the windshield washer includes alcohol both to prevent freezing and act as a solvent. The instant invention is aimed at tubing serving all these and other purposes, both as original equipment or as replacement part.

The standard such tubing as described in German patent 3,821,723 filed June 28, 1988 by E. Brunnhofer comprises three coextruded layers. The outer layer is relatively thick and is formed of polyamide, typically Nylon 12. The inner layer is much thinner and is formed of Nylon 6, Nylon 6.6, Nylon 11, or Nylon 12. The intermediate layer is made of a polyolefin and acts as a block to the diffusion of alcohol to the outer layer, so that the thick outer layer will impart dimensional stability to a hose formed by the tubing.

Particular problems arise, however, when surface-active agents or oxygen-releasing substances pass along such a tubing. In fact cracks and oxidation of the tubing is possible. Furthermore the plastic of the tubing contains substances, monomers or oligomers, which are soluble in the fuel or other liquid in the tubing. Not only does this have a bad effect on the service life of the tubing, but when the vehicle equipped with such tubing is first filled with, for instance, gasoline and then allowed to stand a long time, for instance, during shipping overseas, the composition of the fuel or other liquid in the tubing changes as components of the tubing diffuse into the liquid in the tubing.

Alcohol and aromatics in the fluid diffuse at different rates through the layered tubing wall from the aliphatic components. The resultant change in the composition of the liquid in the tubing changes the solubility thresholds of them so as, for example, to be able to crystalize monomers and oligomers of the Nylon 11 and Nylon 12 into the liquid. The presence of copper ions, which can be picked up from the fuel pump, accelerates this crystallization. The crystallized precipitate can block filters and collect to limit travel of the fuel-pump or carburetor float, and can plug jets or injectors as well as build up on critical control surfaces of the fuel pump.

OBJECTS OF THE INVENTION

It is therefore an object of the present invention to provide an improved multilayer tubing for use as a fuel line.

Another object is the provision of such an improved multilayer tubing for use as a fuel line which overcomes the above-given disadvantages, that is which cannot let a significant amount of the resin forming the tubing from solubilizing, and that remains fairly strong and flexible.

SUMMARY OF THE INVENTION

A layered tubing for use in a motor vehicle according to this invention has five layers, namely a thick tubular outer layer formed of a Nylon 11 or Nylon 12, a thick tubular intermediate layer of Nylon 6, a thin tubular intermediate bonding layer between and bonded to the thick outer and intermediate layers and formed of polyethylene or polypropylene, a thin tubular intermediate solvent-blocking layer inside the thick layers and formed of a copolymer of ethylene and vinylalcohol, and an inner layer of Nylon 6 inside the blocking layer. The thick outer and intermediate layers each have a thickness of between 0.2 mm and 0.7 mm. The thin intermediate blocking layer comprises by weight 30% to 45% polyethylene and the intermediate blocking layer has a thickness of between 0.1 mm and 0.2 mm. The inner layer has a thickness of at most 0.1 to 0.5 mm and the bonding layer has active side chains of maleic acid anhydride and a thickness of between 0.05 mm and 0.2 mm.

With this composition and dimensioning the outer layer effectively prevents the tubing from stretching. In addition the soluble substances of the resins making the tubing cannot go into solution into the fuel or like liquid inside the tubing. This is prevented in that the innermost layer which actually contacts the liquid in the tubing is formed of a special substance that has little that can solubilize in fuel or any other normally alcohol-containing motor-vehicle liquid.

Furthermore according to this invention the inner layer is so very thin that the amount of substances that could be dissolved out of it is very small. It is also within the scope of this invention to make the inner layer out of Nylon 6 which contains practically no soluble monomers or oligomers. In any case the five-layer tubing according to this invention is very strong while remaining quite flexible.

BRIEF DESCRIPTION OF THE DRAWING

The above and other objects, features, and advantages will become more readily apparent from the following, reference being made to the accompanying drawing whose sole figure is a cross section through a tubing according to this invention with elements shown not to scale for clarity of view.

DETAILED DESCRIPTION

As seen in the drawing a tubing for use in a motor vehicle conveying an alcohol-containing liquid, for instance, fuel, comprises a thick outer layer 1, a thick intermediate layer 2, a thin intermediate layer 3, a thin inner layer 4, and a thin outer intermediate layer 5.

The outer layer 1 is formed of a polyamide, Nylon 11 or Nylon 12. It is between 0.2 mm and 0.7 mm thick.

The thick intermediate layer 2 is also formed of a polyamide, here Nylon 6. It is between 0.2 mm and 0.7 mm thick also.

The intermediate bonding layer 3 serves as a blocking layer and is formed of a copolymer of ethylene and vinylalcohol with an ethylene content of between 30% and 45% by weight. It is between 0.1 mm and 0.2 mm thick.

The thin inner layer 4 is made of a polyamide, Nylon 6. It is very thin, between 0.1 mm and 0.3 mm thick. This layer 4 can also be made of an aftercondensed Nylon 6 with a low monomer content.

The thin bonding layer has active side chains of maleic acid anhydride. It is between 0.05 mm and 0.2 mm thick.

I claim:

1. A layered tubing for use in a motor vehicle, the tubing comprising:
    a thick tubular outer layer formed of a Nylon 11 or Nylon 12;
    a thick tubular intermediate layer of Nylon 6;
    a thin tubular intermediate bonding layer between and bonded to the thick outer and intermediate layers and formed of polyethylene or polypropylene;
    a thin tubular intermediate solvent-blocking layer inside the thick layers and formed of a copolymer of ethylene and vinylalcohol; and
    an inner layer of Nylon 6 inside the blocking layer.

2. The tubing defined in claim 1 wherein the outer layer has a thickness of between 0.2 mm and 0.7 mm.

3. The tubing defined in claim defined in claim 1 wherein the thick intermediate layer has a thickness of between 0.2 mm and 0.7 mm.

4. The tubing defined in claim 1 wherein the thin intermediate blocking layer comprises by weight 30% to 45% polyethylene.

5. The tubing defined in claim 1 wherein the intermediate blocking layer has a thickness of between 0.1 mm and 0.2 mm.

6. The tubing defined in claim 1 wherein the inner layer has a thickness of at most 0.1 to 0.5 mm.

7. The tubing defined in claim 1 wherein the bonding layer has active side chains of maleic acid anhydride and a thickness of between 0.05 mm and 0.2 mm.

8. A layered tubing for use in a motor vehicle, the tubing comprising:
    a thick tubular outer layer formed of a Nylon 11 or Nylon 12 and having a thickness of between 0.2 mm and 0.7 mm.
    a thick tubular intermediate layer of Nylon 6 and having a thickness of between 0.2 mm and 0.7 mm;
    a thin tubular intermediate bonding layer between and bonded to the thick outer and intermediate layers, formed of polyethylene or polypropylene, and having a thickness of between 0.05 mm and 0.2 mm;
    a thin tubular intermediate solvent-blocking layer inside the outer layer, formed of a copolymer of ethylene and vinylalcohol, and having a thickness of between 0.1 mm and 0.2 mm; and
    an inner layer of Nylon 6 of a thickness of between 0.1 mm and 0.3 mm.

* * * * *